United States Patent Office 3,311,574
Patented Mar. 28, 1967

3,311,574
FOAMING COMPOSITIONS
William David Samuel Bowering, St. Lambert, and Neil Bonnette Graham, St. Hilaire, Quebec, Canada, assignors to Canadian Industries Limited, Montreal, Quebec, Canada, a corporation of Canada
No Drawing. Filed Apr. 23, 1963, Ser. No. 274,950
Claims priority, application Great Britain, Apr. 25, 1962, 15,812/62
15 Claims. (Cl. 260—2.5)

This invention relates to novel compositions suitable for the production of foamed cellular polymeric materials, novel foaming processes employing such compositions and the novel foamed cellular polymeric materials obtained therefrom.

It is known to manufacture solid foamed polymeric materials by expanding polymeric materials with numerous gas bubbles to yield products having densities as low as one or two pounds per cubic foot. Such polymeric foams are known in both rigid and flexible forms, and typical examples thereof are the polyurethane and polystyrene foams. The former are capable of being foamed-in-place to fill cavities of irregular shape, and they may also be dispensed from mixing machines to coat articles with thick insulating blankets. Their isocyanate ingredients are, however, undesirably toxic under some conditions. The polystyrene foams, on the other hand, are not conveniently foamed-in-place since requiring external heating for this purpose and, in addition, they do not flow easily into complex cavities and do not bond to surfaces.

It is an object of this invention to provide new foaming compositions which are suitable for the production of foamed-in-place polymeric materials and the ingredients of which do not present the toxicity problems encountered with the ingredients of polyurethane foaming compositions. Another object of the invention is to provide new compositions which yield polymeric foams having a wide variety of properties suitable for many end uses. Additional objects of the invention will appear hereinafter.

The new foaming compositions of this invention comprise at least one polymerizable vinyl ether containing at least two vinyl groups per molecule, a foaming agent, an acidic catalyst and, optionally, at least one compound reactive with said vinyl ether.

Any foaming agent may be used in the compositions, particularly those which have been proposed for use in conjunction with polyurethane materials for the production of foamed or cellular materials. Volatile foaming agents are particularly suitable.

As suitable acidic catalysts, there may be used, in particular, those acidic catalysts which have been proposed for the polymerization of vinyl ethers and, more particularly, those which have been proposed for the polymerization of vinyl ethers containing two vinyl groups. Especially useful catalysts are the strong acidic ones.

The compounds reactive with the polymerizable vinyl ethers may be any such compounds. Those which have been found particularly suitable for incorporation in the foaming compositions of this invention are compounds which are reactive with the vinyl ethers under cationic catalysis conditions, e.g. 2-phenyl-3,4-dihydro-2H-pyran and 2-alkyl-3,4-dihydro-2H-pyran. Such compounds tend to slow down the rate of gelation of the compositions and thus yield slower hardening foams.

Of the aforesaid particularly suitable compounds reactive with the polymerizable vinyl ethers, those which have been found to be especially useful are amido compounds containing at least two amido groups per molecule, carbamate compounds containing at least two carbamate groups per molecule and polymerizable alpha, beta-monoethylenically unsaturated compounds, the latter being used optionally in admixture with phenolic compounds, aliphatic monohydric or polyhydric alcohols and epoxidized materials containing at least one epoxide group per molecule.

Thus, in the especially useful foaming compositions of this invention, at least one polymerizable vinyl ether containing at least two vinyl groups per molecule is admixed with the following reactive materials, preferably in the proportions indicated:

(a) A compatible amido compound containing at least two amido groups per molecule, the proportions of the ingredients being preferably such that the number of amido groups provided by said amido compound is less than 10% of the number of vinyl groups provided by said vinyl ether;

(b) A compatible carbamate compound containing at least two carbamate groups per molecule, the proportions of the ingredients being preferably such that the number of carbamate groups provided by said carbamate compound is less than 75% of the number of vinyl groups provided by said vinyl ether;

(c) A compatible polymerizable alpha, beta-monoethylenically unsaturated compound, the proportions of the ingredients being preferably such that the number of ethylenically unsaturated groups provided by said ethylenically unsaturated compound is not greater than three times the number of vinyl groups provided by said vinyl ether;

(d) A compatible polymerizable alpha, beta-monoethylenically unsaturated compound, and a compatible phenolic compound, the proportions of the ingredients being preferably such that the combined number of ethylenically unsaturated and hydroxyl groups provided by said unsaturated compound and phenolic compound, respectively, ranges from less than 75% of the number of vinyl groups provided by said vinyl ether when the compositions contain a large amount of phenolic compound but a small amount of ethylenically unsaturated compound, to not more than three times the number of vinyl groups provided by said vinyl ether when the compositions contain a large amount of ethylenically unsaturated compound but a small amount of phenolic compound;

(e) A compatible alpha, beta-monoethylenically unsaturated compound and a compatible aliphatic monohydric or polyhydric alcohol, the proportions of the ingredients being preferably such that the combined number of ethylenically unsaturated and hydroxyl groups provided by said ethylenically unsaturated compound and alcohol, respectively, ranges from less than 75% of the number of vinyl groups provided by said vinyl ether when the compositions contain a large amount of alcohol but a small amount of ethylenically unsaturated compound, to not more than three times the number of vinyl groups provided by said vinyl ether when the compositions contain a large amount of ethylenically unsaturated compound but a small amount of alcohol; or (f) A compatible alpha, beta-monoethylenically unsaturated compound and a compatible epoxidized material containing at least one epoxide group per molecule, the proportions of the ingredient being preferably such that the number of ethylenically unsaturated groups provided by said ethylenically unsaturated compound is not more than three times the combined number of vinyl groups and epoxide groups provided by said vinyl ether and epoxidized material, respectively.

When the compositions of this invention contain only the vinyl ether, foaming agent and catalyst as essential ingredients, the polymerization of the vinyl ether under the influence of the catalyst and in the presence of the foaming agent leads to the formation of solid polymeric foamed materials.

When the compositions also contain at least one vinyl ether-reactive compound, the said compound or compounds undergo chemical reaction with the vinyl ether under the influence of the catalyst, leading to the formation of polymeric foamed materials of widely varied properties and utilities.

It has been found that organic bases such as the di-methyl tertiary amines derived from coconut fatty acids can be used to retard the reaction of the foam-forming ingredients of the compositions.

The foaming compositions of this invention may also include materials, copolymerizable with the other ingredients thereof, e.g. cyclic anhydrides, as well as non-reactive additives which may be flame retardants, surfactants, dyes, fillers, stabilizers, antioxidants, extenders, plasticizers and viscosity-modifiers such as polyvinyl chloride, vinyl acetate/vinyl chloride copolymers and rubbers.

The polymerizable vinyl ethers, suitable for use in the foaming compositions of this invention, are ethers in which at least two vinyl groups are each joined to an ether oxygen atom.

They may have a generic formula such as (1)  $R_3C=CR_1-O-R_1C=CR_3$
     $\quad\ R\qquad\qquad\ R$ (2)  $\left[\begin{array}{cc}R_4 & R_5\\ R_3C=CR_1-O-C\\ & R_6\end{array}\right]_2$ or (3)  $\left[\begin{array}{cc}R_4 & R_5\\ R_3C=CR_1-O-C\\ & R_6\end{array}\right]_n-A$ wherein $n$ is an integer having a value of at least 2, $R_1$ and $R_2$ are members selected from the group consisting of hydrogen and alkyl radicals, $R_3$ is a member selected from the group consisting of hydrogen, halogen atoms and hydrocarbyl radicals, $R_4$ and $R_5$ taken together form a member selected from the group consisting of two hydrogen atoms, two alkyl radicals and one alkylene or substituted alkylene radical, $R_6$ is a member selected from the group consisting of hydrogen and alkyl radicals, and A is a linking group having a valence equal to $n$.

Examples of the aforementioned vinyl ethers are: divinyl ether, di-isopropenyl ether, butanediol divinyl ether, propylene oxide/polyol condensates of the formulae $$CH_2=CH-O-[CH_2-CH-O]_n-CH=CH_2$$
$$\qquad\qquad\qquad\quad\ |$$
$$\qquad\qquad\qquad\ CH_3$$

and

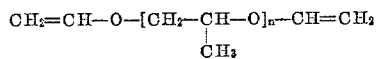

wherein $n$ is any integer, 3,4-dihydro-2H-pyran-2-methyl-(3,4-dihydro-2H-pyran-2-carboxylate) described hereinafter, 1,2 - ethanedioxy - bis-(3',4'-dihydro-2'H-pyran-2'-carbonyl) of the formula

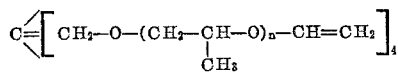

bis-(3,4-dihydro-2H-pyran-2-methyl) succinate of the formula

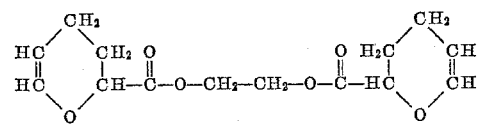

1,2-bis(3',4'-dihydro-2'H - pyran - 2' - oxy)ethane of the formula

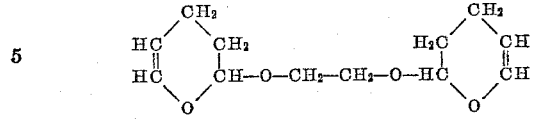

1,1 - bis(3',4' - dihydro - 2'H-pyran - 2' - methoxy)ethane of the formula

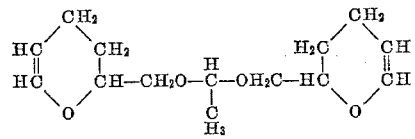

1,2 - ethanedioxy - bis(3',4' - dihydro - 5' - methyl - 2'H-pyran-2'-carbonyl) of the formula

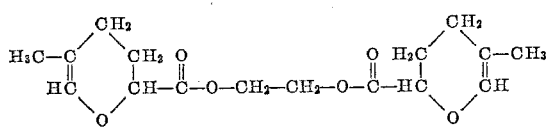

1,2 - bis(3',4' - dihydro - 5' - methyl - 2'H - pyran - 2'-oxy)ethane of the formula

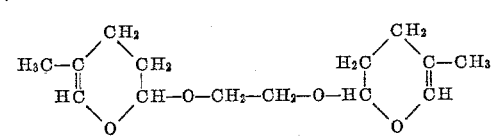

1,1 - bis(3',4' - dihydro - 5' - methyl - 2'H - pyran - 2'-methoxy)ethane of the formula

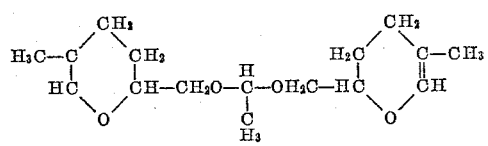

toluene - 2,4 - (bis - 3',4' - dihydro - 2'H - pyran - 2'-methyl) carbamate of the formula

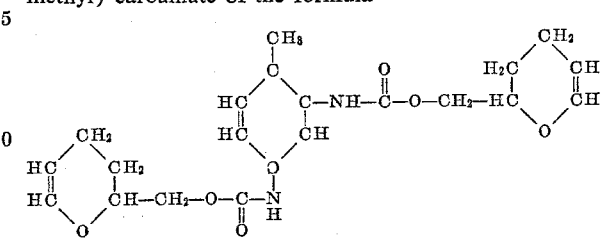

the tri-ester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids such as maleic and adipic acids. It has been found that the straight chain vinyl ethers are more reactive than branched chain or cyclic vinyl ethers. It is desirable that the vinyl ethers do not boil during the foam-forming reaction.

Amongst the suitable amido compounds containing at least two amido groups per molecule, there may be mentioned the diamide derived from dimerized linseed oil acids and having the formula

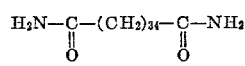

and the polyamide derived from isophthalic acid and pentamethylene diamine.

Examples of polycarbamates are those derived from organic polyisocyanates and polyols such as the condensation product of tolylene diisocyanate and pentamethylene glycol of formula

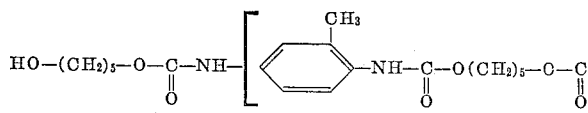 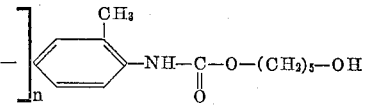

and the condensation product of diphenylmethane 4,4'-diisocyanate and polypropylene glycol of molecular weight 425.

Examples of polymerizable alpha,beta-monoethylenically unsaturated compound are 3,4-dihydro-2H-pyran, 2-ethoxy-3,4-dihydro-2H-pyran, 2-alkyl-3,4-dihydro-2H-pyran, 2-phenyl-3,4-dihydro-2H-pyran, 1-decene, vinyl stearate, lauryl vinyl ether, dibutyl maleate, maleic anhydride, vinyl cyclohexene, alkyl acrylates, alkyl methacrylates, styrene, etc. These compounds preferably should not boil during the foam-forming reaction.

The phenolic compounds and as ingredients in the foaming compositions are those aromatic compounds which contain one or more hydroxyl groups in their molecules such as phenol, alkyl-substituted phenols, e.g. cresols, halogen-substituted phenols, e.g. 2,4,5-trichlorophenol, resorcinolphloroglucinol, catechol, hydroquinone, 2:2-di-p-hydroxyphenylpropane, low molecular weight phenol-terminated polycarbonates, the condensation products of phenols with aldehydes and ketones, etc.

The aliphatic monohydric or polyhydric alcohol ingredients of the foaming compositions of this invention include amyl alcohol, 2-ethylhexyl alcohol, nonyl alcohol, n-decyl alcohol, polypropylene glycol, caster oil, sugar alcohols, alkyl and acyl cellulose derivatives, polyether condensates of polyhydric alcohols and olefin oxides such as the polypropylene oxide condensates of hexahydroxy sugar alcohols and propylene oxide, ethylene glycol, 1,5-pentanediol, glycerol, 1,2,6-hexanetriol and hydroxyl-containing esters and polyesters obtained by condensation of polyhydric alcohols and polybasic acids. The proportions of condensating ingredients in said hydroxyl-containing esters and polyesters may range from one mole of polyol for each carboxylic acid group in the acid to one mole of polycarboxylic acid for each hydroxyl group in the polyol. The first limit gives an ester containing free alcoholic hydroxyl groups whereas the second gives an ester containing carboxylic acid groups; in between these limits, polyesters are formed which contain both hydroxyl and carboxylic acid groups.

By "epoxidized materials containing at least one epoxide group per molecule" are meant compounds containing at least one group of the formula

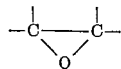

per molecule. Examples of such compounds are epichlorohydrin, styrene oxide, diallyl ether monoxide, cyclohexene oxide, glycidyl phenyl ether, glycidyl stearate, dipentene dioxide, vinyl cyclohexene dioxide, polyallyl glycidyl ether, diphenylolpropane diglycidyl ether, epoxidized polbutadiene, epoxidized styrene-butadiene copolymers, the resinous condensates of epichlorohydrin and aliphatic or aromatic polyols such as glycerol or 2:2-di-p-hydroxyphenyl propane, etc.

Volatile foaming agents suitable for use in the foaming compositions of the invention are those which are soluble or dispersible in the other ingredients of the foaming compositions and are sufficiently volatile that they vaporize during the formation of the foamed polymeric materials. The heat of the catalyzed polymerization reaction causes the foaming agent to boil, and the vapour forms bubbles which expand during the polymerization reaction to give a low density, foamed polymerized mass. Preferred foaming agents are the halogenated hydrocarbons such as trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

The strong acid catalysts suitable for promoting the reaction of the polymer-forming ingredients of the foaming compositions include the strong proton-donating acids, such as p-toluenesulphonic acid, and the Lewis acids such as trimethoxyboroxine and boron trifluoride conveniently employed as the etherate, $BF_3 \cdot (C_2H_5)_2O$. Compositions containing very reactive vinyl ethers such as butanediol divinyl ether can be catalyzed by p-toluenesulphonic acid but a Lewis acid catalyst is preferred for those compositions containing 3,4-dihydro-2H-pyranyl compounds including the 3,4-dihydro-2H-pyran-2-methyl-(3,4-dihydro-2H-pyran-2-carboxylate) referred to hereinafter.

It is possible to control the polymerization reaction by employing catalyst combinations e.g. p-toluene sulphonic acid and boron trifluoride or boron trifluoride and trimethoxyboroxine. Other materials which are suitable as catalytic ingredients are ferric chloride, stannic chloride, phosphorus pentachloride, phosphoric acid, perchloric acid, acetic acid, trifluoroacetic acid, trichloroacetic acid, fluoroboric acid, boron trifluoride dihydrate, hydrogen fluoride, antimony pentafluoride, hexafluorophosphoric acid, lead fluoborate, antimony fluoborate, sulphuric acid and silicotungstic acid. The solvent in which the catalyst is dissolved also affects the catalyst reactivity, polypropylene glycol solutions of $BF_3 \cdot (C_2H_5)_2O$ being less reactive than xylene solutions of said catalyst. Suitable catalytic amounts range from 0.005% to 2.0% by weight of the compositions, but these amounts are not limitative since the amount of catalyst should be adjusted to the temperature of operation and the foam induction period required. When Lewis acids are used as catalysts in foaming compositions devoid of phenolic or alcoholic ingredients, it is often advantageous to incorporate into the compositions small amounts of cocatalysts such as water, alcohols or carboxylic acids.

Suitable flame-retardants for incorporation in the foaming compositions include trichloroethylphosphate, 2:2 - bis(3',5'-dibromo-4'-hydroxphenyl) propane, chlorendic acid and polyvinyl chloride, with or without antimony oxide.

The preferred surfactants are those of the silicone type, examples of which are disclosed in Belgian Patent Nos. 582,362 and 584,089, i.e. being of the siloxane oxyalkylene copolymer type.

In the above list of vinyl ether-reactive materials, preferred proportions are indicated. However, the proportions of such reactive materials in relation to proportions of vinyl ethers may vary considerably. The use of widely differing proportions leads to the formation of foamed materials of differing properties, e.g. different compression strength, density and texture. In order to obtain foamed materials of advantageous properties and of particular utility, it is often necessary to vary the proportions of vinyl ether and vinyl ether-reactive material according to the nature of the reactive material used.

Referring, then, to particularly preferred proportions of the ingredients of the foaming compositions of this invention, it has been found that in the case of compositions containing only a polymerizable vinyl ether as foamable polymer-forming component, preferred proportions are from 50% to 85% by weight of said vinyl ether and from 2% to 30% by weight of volatile foaming agent, the remaining ingredients such as surfactant and flame-retardant being present in amounts less than about 15% by weight.

Preferred compositions containing ether-reactive material (a) comprise at least 50% by weight of the vinyl ether, the amount of the amido compound containing at least two amido groups per molecule being such that the number of amido groups provided thereby is less than 10% of the number of vinyl groups provided by said vinyl ether, and from 2% to 30% by weight of the foaming agent, the remaining ingredients such as surfactant and flame-retardant being present in amounts less than about 15% by weight.

The admixture of amido compounds containing at least two amido groups per molecule with the vinyl ethers as ingredients of the foaming compositions slows down the foaming reaction and thus increases the foam induction period with improvement in handling of the foaming process.

In the case of compositions containing ether-reactive material (b) suitable compositions comprise at least 50% by weight of the vinyl ether, the amount of the carbamate compound being such that the number of carbamate groups provided thereby is less than 75% of the number of vinyl groups provided by the vinyl ether, and from 2% to 30% by weight of the foaming agent, the remaining ingredients such as surfactant and flame-retardant being present in amounts less than about 15% by weight.

The inclusion of the carbamate compounds in the compositions results in foams which are tougher and more resilient than foams derived from vinyl ethers alone, and which possess good dimensional stability under conditions of high temperature and humidity.

Preferred compositions having ether-reactive material (c) comprise at least 30% by weight of the vinyl ether, the monoethylenically unsaturated compound in a proportion such that the number of ethylenically unsaturated groups provided thereby is not greater than three times the number of vinyl groups provided by said vinyl ether, and from 2% to 30% by weight of the foaming agent, the remaining ingredients such as surfactant and flame-retardant being present in amounts less than about 15% by weight.

The inclusion of monoethylenically unsaturated compounds in the foaming compositions imparts a slower rate of set and greater control of rise to the resulting foams than when the compositions only contain the vinyl ethers as polymerizable ingredients.

Compositions containing ether-reactive material (d) preferably comprise at least 30% by weight of the vinyl ether, the proportions of the monoethylenically unsaturated and phenolic compounds being such that the combined number of ethylenically unsaturated and hydroxyl groups provided thereby ranges from less than 75% of the number of vinyl groups provided by said vinyl ether when the compositions contain a large amount of phenolic compound but a small amount of ethylenically unsaturated compound, to not more than three times the number of vinyl groups provided by said vinyl ether when the composition contains a large amount of ethylenically unsaturated compound but a small amount of phenolic compound, and from 2% to 30% by weight of the foaming agent, the remaining ingredients such as surfactant and flame-retardant being present in amounts less than about 15% by weight.

The inclusion of the phenolic compound with the monoethylenically unsaturated compounds in the compositions imparts a slower rate of foam set and greater control of foam rise, thus giving better skins and improved colour to the foams.

For compositions containing ether-reactive material (e), preferred proportions are at least 30% by weight of the vinyl ether, the amounts of the monoethylenically unsaturated compound and the aliphatic monohydric or polyhydric alcohol being such that the combined number of ethylenically unsaturated groups and hydroxyl groups provided thereby ranges from less than 75% of the number of vinyl groups provided by said vinyl ether when the compositions contain a large amount of alcohol but a small amount of ethylenically unsaturated compound, to not more than three times the number of vinyl groups provided by said vinyl ether when the compositions contain a large amount of ethylenically unsaturated compound but a small amount of alcohol, and from 2% to 30% by weight of the foaming agent, the remaining ingredients such as surfactant and flame-retardant being present in amounts less than about 15% by weight.

The admixture of the alcohol with the vinyl ether and ethylenically unsaturated ingredients of the compositions gives improved foams characterized by low density and fine even texture.

Preferred compositions containing ether-reactive material (f) comprise at least 30% by weight of the vinyl ether, the monoethylenically unsaturated compound and the epoxidized material being present in amounts such that the number of ethylenically unsaturated groups provided by said compound is not more than three times the combined number of vinyl groups and epoxide groups provided by said vinyl ether, and epoxidized material, respectively, and from 2% to 30% by weight of the foaming agent, the remaining ingredients such as surfactant and flame-retardant being present in amounts less than about 15% by weight.

The presence of epoxidized material in the compositions, in addition to the vinyl ether and monoethylenically unsaturated ingredients, results in improved foams characterized by good tough skins, light colour and fine cell structure.

The ingredients of the foaming compositions may simply be mixed by stirring in a vessel and then quickly poured into a mould. They may also be mixed in the space which is to be filled with foam if it is suitably shaped. When such stirred mixing is used, it is highly desirable that a surfactant be added to the compositions in order to give foams of small bubbles. However, a surfactant is not always essential. For example, in certain foam-dispensing machines, the ingredients are mixed under pressure using a foaming agent which is gaseous at the mixing temperature, the pressure being controllably released, and the "frothed" mixture is then dispersed to the point of use. In such a "frothing" machine, a surfactant is not essential. However, in ordinary dispensing machines wherein the foaming compositions are dispensed before foaming starts, the use of a surfactant is often desirable. In many recipes, it has been found that reduction of the amount of surfactant to the point where the bubbles just burst as polymerization is complete gives foams of the known "open cell" structure.

The foams of this invention in the flexible form may be used for upholstery, mattresses, etc. In the rigid form they are eminently suited for heat and sound insulating purposes, either in closed cavities or as enveloping blankets.

The invention will be more fully illustrated by the following examples but it is to be understood that its scope is not to be limited to the specific embodiments shown.

A preferred vinyl ether used in the examples is 3,4-dihydro - 2H - pyran-2-methyl-(3,4-dihydro-2H-pyran-2-carboxylate) of the following formula:

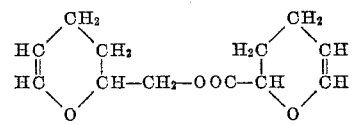

It may be prepared by the self-condensation of acrolein dimer (2-formyl-3,4-dihydro-2H-pyran) in the presence of about 0.3% of aluminium isoproxide, the reaction temperature being held at 45° C. for 6 hours. A purified product may be obtained by flash distillation in a falling film still at 150° C. under vacuum, but satisfactory foams can be obtained with the undistilled product.

EXAMPLE 1

200 g. of 3,4-dihydro-2H-pyran-2-methyl-(3,4-dihydro-2H-pyran-2-carboxylate) were mixed with 50 g. of trichloromonofluoromethane, 2.5 g. of a boron trifluoride solution made up from $BF_3$ etherate containing 49% $BF_3$ diluted to 10% $BF_3$ with diethylene glycol, and 5.0 g. of siloxane oxyalkylene copolymer type silicone surfactant. The induction period before foaming for this mixture was about 60 secs., and the mixture was stirred vigorously until just before foaming began. It was then poured rapidly into a mold and reacted to yield a rigid foam having a density of about 2.5 lbs./cu. ft.

EXAMPLE 2

In an experiment similar to that of Example 1, 5.0 g. of the $BF_3$ etherate solution was used. The induction period was shortened to 25 secs. and a foam having the same density was obtained.

The mixture had a 90 secs. induction period and foamed to a rigid foam of very even structure and density of about 2.5 lbs./cu. ft.

EXAMPLES 5 TO 13

A series of nine foams were prepared containing different vinyl ethers using the following procedure. The vinyl ether, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table I.

TABLE I

| Example | Vinyl Ether | Siloxane oxyalkylene copolymer type silicon surfactant, g. | Trichloromonofluoromethane, g. | Boron trifluoride 10% in diethylene glycol, ml. | Induction Period, sec. | Rise Period, sec. | Height, inches |
|---|---|---|---|---|---|---|---|
| 5 | 3,4-dihydro-2H-pyran-2-methyl-(3,4-dihydro-2H-pyran-2-carboxylate): 20 g. | 0.5 | 5 | 1.0 | 80 | 8 | 8.75 |
| 6 | Bis-(3,4 dihydro-2H-pyran-2-methyl) succinate: 20 g. | 0.5 | 4 | (1) | 15 | 15 | |
| 7 | Bis-(3,4-dihydro-2H-pyran-2-methyl) adipate: 20 g. | 0.5 | 5 | 0.5 | 90 | 20 | 8 |
| 8 | Bis-(3,4-dihydro-2H-pyran-2-methyl) azelate: 20 | 0.5 | 5 | 0.6 | 165 | 15 | 5.5 |
| 9 | 20 | 0.5 | 5 | 1.0 | 95 | 10 | 6.75 |
| 10 | Bis-(3,4-dihydro-2H-pyran-2-methyl): sebacate: 20 g. | 0.5 | 5 | 1.0 | 110 | 10 | 6.75 |
| 11 | 20 g. | 0.5 | 5 | 1.4 | 95 | 10 | 5.5 |
| 12 | Bis-(3,4-dihydro-2H-pyran-2-methyl) phthalate: 20 g. | 0.5 | 5 | 1.0 | 50 | 20 | |
| 13 | Bis-(3,4-dihydro-2H-pyran-2-methyl) fumarate: 10 g. | 0.3 | 3 | 0.6 | 165 | 45 | 4.5 |

1 0.75 ml. of 10% $BF_3$ in polypropylene glycol M.W. 2025 dissolved in 1.0 g. trichloromonofluoromethane.

EXAMPLE 3

The following mixture was prepared:

| | G. |
|---|---|
| 3,4-dihydro-2H-pyran-2-methyl-(3,4-dihydro-2H-pyran-2-carboxylate) | 270 |
| Trichloromonofluoromethane | 50 |
| 5% perchloric acid in diethylene glycol | 4.0 |
| Siloxane oxyalkylene copolymer type silicone surfactant | 15 |

The induction period was 30 secs., and the product was a rigid foam having a density of 2.4 lbs./cu. ft.

EXAMPLE 4

The following mixture was prepared:

| | G. |
|---|---|
| 3,4-dihydro-2H-pyran-2-methyl (3,4-dihydro-2H-pyran-2-carboxylate) | 14 |
| Dioctyl phthalate plasticizer | 6 |
| Trichloromonofluoromethane | 7 |
| 10% $BF_3$ in glycol | 2 |
| Siloxane oxyalkylene copolymer type silicone surfactant | 15 |

EXAMPLES 14 to 18

A series of five foams were prepared derived from crude 3,4-dihydro-2H-pyran-2-methyl-(3,4-dihydro-2H-pyran-2-carboxylate) admixed with an additional vinyl ether and employing different catalyst systems. The following are the proportions of the mixture employed.

| | Gr. |
|---|---|
| Crude 3,4-dihydro-2H-pyran-2-methyl-(3,4-dihydro-2H-pyran-2-carboxylate) | 20 |
| Additional vinyl ether | 5 |
| Trichloromonofluoromethane | 5 |
| Siloxane oxyalkylene copolymer type silicone surfactant | 0.1 |
| Catalyst as specified in Table II. | |

The ingredients were mixed together in a 250 ml. paper cup. The foams are described in Table II. The catalyst concentration is expressed as percentage by weight of the active ingredient.

TABLE II

| Example | Additional Vinyl Ether | Catalyst | Amount of catalyst drops | Induction Period, seconds | Height of Foam, inches |
|---|---|---|---|---|---|
| 14 | Divinyl ether of polypropylene glycol of molecular weight 425. | Fluoboric acid, 48%-50% in water | 3 | 5 | 8 |
| 15 | Divinyl ether of polypropylene glycol of molecular weight 425. | Fluoboric acid, 5% in diethylene glycol | 25 | 255 | 4 |
| 16 | Trivinyl ether of propoxylated phenol-aldehyde condensate of molecular weight 440. | Fluoboric acid, 48%-50% in water | 2 | 5 | 2 |
| 17 | Tetravinyl ether of polypropoxylated pentaerythritol. | Fluoboric acid, 48%-50% in water | 3 | (1) | |
| 18 | Tetravinyl ether of polypropoxylated pentaerythritol. | Fluoantimonic acid (HSbF$_6$) 65% in water. | 4 | (1) | |

[1] Very fast.

EXAMPLES 19 TO 27

A series of nine foams were prepared each of the following composition:

| | G. |
|---|---|
| Vinyl ether | 25 |
| Trichloromonofluoromethane | 5 |
| Siloxane oxyalkylene copolymer type silicone surfactant | 0.1 |

Catalyst, as specified in Table III.

The above ingredients were mixed in a 250 ml. paper cup and the induction period and rise time of the resulting foams were measured. The description of the foams is given in Table III. The catalyst concentration is expressed as percentage by weight of the active ingredient.

EXAMPLES 28 TO 28f

A series of seven foams were prepared containing tris-(3,4-dihydro-2H-pyran-2-methyl) phosphate alone and in admixture with another vinyl ether using the following procedure. The phosphate the additional vinyl ether, when present, the siloxane oxyalkylene copolymer type silicone surfactant and the trichloromonofluoromethane foaming agent were mixed together. The boron trifluoride catalyst was then added with additional stirring and the composition was poured into a 250 ml. paper cup. The induction period, time of rise of the foams and the height of the foam were measured. The compositions and resulting foams are described in Table IV. The catalyst concentration is expressed as weight percent of the boron trifluoride, present as the etherate, in diethylene glycol.

TABLE III

| Example | Additional Vinyl Ether | Catalyst | Amount of catalyst drops | Induction Period, seconds | Height of Foam, inches |
|---|---|---|---|---|---|
| 19 | Bis-(3,4-dihydro-2H-pyran-2-methyl) succinate. | Fluoboric acid, 48%-50% in water | 3 | 5 | 7 |
| 20 | Bis-(3,4-dihydro-2H-pyran-2-methyl) adipate | Fluoantimonic acid, (HSbF$_6$) 65% in water. | 5 | 5 | 6 |
| 21 | Bis-(3,4-dihydro-2H-pyran-2-methyl) azelate | Phosphorus pentafluoride 10.5% in diethylene glycol. | 20 | 90 | 3¾ |
| 22 | do | do | 10 | 180 | 2 |
| 23 | Bis-(3,4-dihydro-2H-pyran-2-methyl) sebacate | Fluoboric acid, 48%-50% in water | 3 | 20 | 4 |
| 24 | Divinyl ether of polypropylene glycol of molecular weight 425. | Antimony fluoborate, 40%-43% in water. | 5 | 5 | |
| 25 | do | do | 2 | 5 | 4 |
| 26 | do | Lead fluoborate, 50%-52% in water | 15 | 380 | 4 |
| 27 | Tetravinyl ether of polypropoxylated pentaerythritol. | Fluoboric acid, 48%-50% in water | 2 | 180 | 3 |

TABLE IV

| Example | Tris-(3,4-dihydro-2H-pyran-2-methyl) phosphate, g. | Additional Vinyl Ether | Siloxane oxyalkylene copolymer type surfactant, g. | Trichloromonofluoromethane, g. | Boron trifluoride, 10% in diethyleneglycol, ml. | Induction Period, secs. | Rise time secs. | Height of foam, inches |
|---|---|---|---|---|---|---|---|---|
| 28 | 10 | 3,4-dihydro-2H-pyran-2-methyl-(3-4-dihydro-2H-pyran-2-carboxylate): | 0.3 | 3 | 1.5 | 40 | 50 | 3.25 |
| 28a | 10 | 10 g | 0.5 | 5 | 1.5 | 50 | 90 | 6.5 |
| 28b | 10 | 10 g | 0.5 | 5 | 2.5 | 35 | 65 | 6.25 |
| | | Bis-(3,4-dihydro-2H-pyran-2-methyl) adipate: | | | | | | |
| 28c | 10 | 10 g | 0.5 | 5 | 1.0 | 55 | 145 | 5 |
| 28d | 10 | 10 g | 0.5 | 5 | 2.0 | 90 | 90 | 6 |
| 28e | 5 | 10 g | 0.5 | 5 | 2.0 | 25 | 25 | 4.5 |
| 28f | 5 | Bis-(3,4-dihydro-2H-pyran-2-methyl) azelate: 10 g. | 0.5 | 5 | 1.5 | 30 | 30 | 3.5 |

EXAMPLES 28g TO 28k

The following series of 5 foaming compositions were prepared containing bis-(3,4-dihydro-2H-pyran-2-methyl) terephthalate and an additional vinyl ether using the following procedure. The two vinyl ethers, the surfactant and foaming agent were mixed together and then the boron trifluoride catalyst was added with additional stirring. The compositions was then poured into a 250 ml. paper cup and the induction period the rise time and height of the resulting foams were measured. The description of the foams is given in Table IV(a).

EXAMPLES 29 TO 42

A series of fourteen foams were prepared containing the triamide of the cyclic tricarboxylic acid which is the cyclic trimer of unsaturated fatty acids containing 18 carbon atoms in the molecule ("Emery" 3162–O Trimer Acid) and different vinyl ethers using the following procedure. The vinyl ether, the triamide, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table V.

EXAMPLES 43 TO 45

A series of three foams were prepared containing a high viscosity epoxidized polyolefin ("Oxiron" 2000), the triamide of the cyclic tricarboxylic acid which is the cyclic trimer of unsaturated fatty acids containing 18 carbon atoms in the molecule ("Emery" 3162–O trimer acid) and 3,4-dihydro-2H-pyran-2-methyl-(3,4-dihydro-2H-pyran-2-carboxylate) using the following procedure. The vinyl ether, the epoxidized polyolefin, the triamide, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table VI.

TABLE IV(a)

| Example | Bis-(3,4-dihydro-2H-pyran-2-methyl) terephthalate, g. | Additional Vinyl Ether | Siloxane oxyalkylene copolymer type silicone surfactant, g. | Trichloromonofluoromethane, g. | Boron trifluoride, 10% in diethyleneglycol, ml. | Induction Period, secs. | Rise time secs. | Height of foam, inches |
|---|---|---|---|---|---|---|---|---|
| 28g | 10 | 3,4-dihydro-2H-pyran-2-methyl-(3,4-dihydro-2H-pyran-2-carboxylate): 10 g. | 0.5 | 5 | 1.5 | 45 | 15 | 10.75 |
| | | Bis-(3,4-dihydro-2H-pyran-2-methyl) adipate: | | | | | | |
| 28h | 10 | 10 g | 0.5 | 5 | 1.5 | 25 | 15 | 10.75 |
| 28i | 15 | 15 g | 0.5 | 5 | 1.5 | 70 | 10 | 9 |
| 28j | 10 | Bis-(3,4-dihydro-2H-pyran-2-methyl) azelate: 10 g. | 0.5 | 5 | 1.5 | 70 | 15 | 8.5 |
| 28k | 10 | Bis-(3,4-dihydro-2H-pyran-2-methyl) sebacate: 10 g. | 0.5 | 5 | 1.5 | 85 | 15 | 8.75 |

TABLE V

| Ex. | Vinyl Ether | Cyclic tricarboxylic acid amide, g. | Siloxane oxyalkylene copolymer type silicone surfactant, g. | Trichloromonofluoromethane, g. | Boron trifluoride, 10% in diethylene glycol, ml. | Induction period, sec. | Rise period, sec. | Height, in. |
|---|---|---|---|---|---|---|---|---|
| | 3,4-dihydro-2H-pyran-2-methyl-(3,4-dihydro-2H-pyran-2-carboxylate): | | | | | | | |
| 29 | 20 g | 1 | 0.5 | 5 | 2.5 | 150 | 15 | 5.5 |
| 30 | 20 g | 2 | 0.5 | 5 | 2.5 | 240 | 45 | 8 |
| 31 | 20 g | 3 | 0.5 | 5 | 2.5 | 540 | 60 | 1.75 |
| 32 | 20 g | 4 | 0.5 | 5 | 3.5 | 270 | 100 | |
| | Bis-(3,4-dihydro-2H-pyran-2-methyl) adipate: | | | | | | | |
| 33 | 20 g | 1 | 0.5 | 5 | 1.5 | 140 | 20 | 6.25 |
| 34 | 20 g | 3 | 0.5 | 5 | 2.0 | 540 | | |
| 35 | 20 g | 2 | 0.5 | 5 | 2.5 | 130 | 30 | 9 |
| 36 | 20 g | 2 | 0.5 | 5 | 3.0 | 150 | 60 | 8.5 |
| 37 | 20 g | 5 | 0.5 | 5 | 4.5 | 120 | 70 | 7.5 |
| | Bis-(3,4-dihydro-2H-pyran-2-methyl) azelate: | | | | | | | |
| 38 | 20 g | 1 | 0.5 | 5 | 2.0 | 180 | 20 | 5.25 |
| 39 | 20 g | 3 | 0.5 | 5 | 3.5 | 210 | 70 | 7.5 |
| 40 | 20 g | 5 | 0.5 | 5 | 5.0 | 180 | 60 | 5 |
| | Bis-(3,4-dihydro-2H-pyran-2-methyl) sebacate: | | | | | | | |
| 41 | 20 g | 1 | 0.5 | 5 | 2.0 | 160 | 20 | 4 |
| 42 | 20 g | 3 | 0.5 | 5, | 3.5 | 200 | 70 | 7 |

TABLE VI

| Example | 3,4-dihydro-2H-pyran-2-methyl-(3,4-dihydro-2H-pyran-2-carboxylate), g. | High viscosity epoxidized polyolefin, g. | Cyclic tricarboxylic acid amide, g. | Siloxane oxyalkylene copolymer type silicone surfactant, g. | Trichloromonofluoromethane, g. | Boron trifluoride 10% in Diethylene glycol, ml. | Induction period, sec. | Rise Period, sec. | Height, in. |
|---|---|---|---|---|---|---|---|---|---|
| 43 | 20 | 5 | 4 | 0.5 | 5 | 3.5 | 15 | 90 | 7 |
| 44 | 20 | 7.5 | 4 | 0.5 | 5 | 4.0 | 5 | 35 | 7.75 |
| 45 | 20 | 5 | 4 | 0.5 | 5 | 4.0 | 10 | 80 | 8.5 |

EXAMPLES 46 TO 53

A carbamate group-containing prepolymer was prepared in the following manner. 1,5-pentanediol (52.1 g., 0.5 mole) was added dropwise with stirring to toluene-2,4-diisocyanate (174 g., 1 mole). The temperature was kept between 60° C. and 70° C. by occasional cooling. A white, opaque brittle glass was obtained. The infrared spectrum of the prepolymer showed the presence of free isocyanate groups but no hydroxyl groups.

A series of eight foams were prepared containing the above described carbamate group-containing prepolymer and different vinyl ethers using the following procedure. The vinyl ether, the carbamate group-containing prepolymer, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the time of rise of the foam and the height of the foam after rise were measured. The compositions and characteristics of the resulting foams are given in Table VII.

and different vinyl ethers using the following procedure. The vinyl ether, the carbamate group-containing prepolymer, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the time of rise of the foam and the height of the foam after rise were measured. The compositions and characteristics of the resulting foams are shown in Table VIII.

EXAMPLE 61

The following two mixtures were prepared:

Mixture A

| | G. |
|---|---|
| Crude 3,4-dihydro-2H-pyran-2-methyl-(3,4-dihydro-2H-pyran-2-carboxylate) | 200 |
| 3,4-dihydro-2H-pyran | 50 |
| Siloxane oxyalkylene copolymer type silicone surfactant | 2.5 |
| Trichloromonofluoromethane | 50 |
| Trimethoxyboroxine | 20 |

TABLE VII

| Ex. | Vinyl Ether | Carbamate group containing prepolymer, g. | Siloxane oxyalkylene copolymer type silicone surfactant, g. | Trichloro-monofluoro-methane, g. | Boron trifluoride 10% in diethylglycol, ml. | Induction period, sec. | Rise period, sec. | Height, in. |
|---|---|---|---|---|---|---|---|---|
| | 3,4-dihydro-2H-pyran-2-methyl-(3,4-dihydro-2H-pyran-2-carboxylate): | | | | | | | |
| 46 | 20 g. | 1 | 0.5 | 5 | 1.5 | 210 | 15 | 7.75 |
| 47 | 20 g. | 4 | 0.5 | 5 | 2.0 | 30 | 10 | 11.25 |
| 48 | 20 g. | 4 | 0.5 | 5 | 1.5 | 8 | 5 | 9.75 |
| 49 | 20 g. | 8 | 0.5 | 5 | 1.5 | 60 | 30 | 11.5 |
| 50 | 20 g. | 12 | 0.5 | 5 | 1.5 | 120 | 45 | 11.25 |
| 51 | Bis-(3,4-dihydro-2H-pyran-2-methyl) adipate: 20 g. | 6 | 0.5 | 5 | 1.5 | 20 | 10 | 9.75 |
| 52 | Bis-(3,4-dihydro-2H-pyran-2-methyl) azelate: 20 g. | 6 | 0.5 | 5 | 1.5 | 60 | 20 | 9.75 |
| 53 | Bis-(3,4-dihydro-2H-pyran-2-methyl) sebacate: 20 g. | 6 | 0.5 | 5 | 1.5 | 50 | 15 | 9 |

TABLE VIII

| Ex. | Vinyl Ether | Carbamate group containing prepolymer, g. | Siloxane oxyalkylene copolymer type silicone surfactant, g. | Trichloro-monofluoro-methane, g. | Boron trifluoride 10% in diethylene glycol, ml. | Induction period, sec. | Rise period, sec. | Height, in. |
|---|---|---|---|---|---|---|---|---|
| | 3,4-dihydro-2H-pyran-2-methyl-(3,4-dihydro-2H-pyran-2-carboxylate): | | | | | | | |
| 54 | 20 g. | 1 | 0.5 | 5 | 1.5 | 90 | 30 | 8.25 |
| 55 | 20 g. | 7.5 | 0.5 | 5 | 2.0 | 90 | 80 | 7.5 |
| 56 | 20 g. | 2 | 0.5 | 5 | 1.5 | 100 | 35 | 9.25 |
| 57 | 20 g. | 4 | 0.5 | 5 | 2.0 | 45 | 30 | 10.25 |
| 58 | Bis-(3,4-dihydro-2H-pyran-2-methyl) adipate: 20 g. | 4 | 0.5 | 5 | 2.0 | 90 | 30 | 8 |
| | Bis-(3,4-dihydro-2H-pyran-2-methyl) sebacate: | | | | | | | |
| 59 | 20 g. | 4 | 0.5 | 5 | 2.0 | 25 | 10 | 5.25 |
| 60 | 20 g. | 1 | 0.5 | 5 | 1.5 | 200 | 25 | 6.5 |

EXAMPLES 54 TO 60

A carbamate group-containing prepolymer was prepared in the following manner. Toluene-2,4-diisocyanate (87 g., 0.5 mole) was added dropwise with stirring to 1,5-pentanediol (104.2 g., 1 mole). The temperature was kept between 60° C. and 65° C. by occasional cooling. The resulting prepolymer was a very viscous, colourless glass. The infrared spectrum of the prepolymer showed the presence of free hydroxyl groups but no isocyanate groups.

A series of seven foams were prepared containing the above described carbamate group-containing prepolymer

Mixture B

Boron trifluoride (10%) in diethylene glycol _____ 15

Mixture B was added to Mixture A with mechanical stirring. After 10 seconds of mixing, the composition was poured into a mould and foaming occured after 20 seconds. A dark coloured rigid foam resulted which had a core density of 1.2 lbs./cu./ft.

EXAMPLE 62

The following two mixtures were prepared:

Mixture A

|  | G. |
|---|---|
| Crude 3,4-dihydro-2H-pyran-2-methyl-(3,4-dihydro-2H-pyran-2-carboxylate) | 200 |
| 2-ethoxy-3,4-dihydro-2H-pyran | 100 |
| Siloxane oxyalkylene copolymer type silicone surfactant | 2.5 |
| Trichloromonofluoromethane | 50 |

Mixture B

|  | |
|---|---|
| Boron trifluoride (10% in diethylene glycol) | 10 |
| p-Toluene sulphonic acid (20% in ethyl acetate) | 30 |

Mixture B was added to Mixture A with mechanical stirring. After 10 seconds of mixing the composition was poured into a mould and foaming occurred after 17 seconds. A dark coloured rigid foam resulted which had a core density of 2.4 lbs./cu.ft.

EXAMPLE 63

The following two mixtures were prepared:

Mixture A

|  | G. |
|---|---|
| Crude 3,4-dihydro-2H-pyran-2-methyl-(3,4-dihydro-2H-pyran-2-carboxylate) | 340 |
| Vinyl lauryl ether | 60 |
| Siloxane oxyalkylene copolymer type silicone surfactant | 2 |

Mixture B

|  | |
|---|---|
| Boron trifluoride 48% as etherate | 12 |
| Trichloromonofluoromethane | 60 |

Mixture B was added to Mixture A with mechanical stirring. After 5 seconds of mixing the composition was poured into a mould and foaming commenced after 9 seconds. A light coloured foam of fine texture and having a density of 2.0 lbs./cu. ft. resulted.

EXAMPLES 64 TO 68

A series of foams were prepared in the following manner. Firstly, a mixture containing crude 3,4-dihydro-2H-pyran-2-methyl-(3,4-dihydro-2H-pyran-2-carboxylate), the monoethylenically unsaturated compound, the surfactant and the trichloromonofluoromethane foaming agent was prepared. To this mixture the boron trifluoride catalyst was added while stirring with a mechanical stirrer. After 10 seconds the composition was poured into a mould. In Table IX the foaming compositions and the resulting foams are described.

EXAMPLE 69

A monoethylenically unsaturated compound was prepared as follows: 0.75 gram of p-toluenesulphonic acid was dissolved in 130 grams of 2-ethylhexanol. This solution was added to 225 grams of distilled 3,4-dihydro-2H-pyran - 2 - methyl - (3,4 - dihydro - 2H - pyran-2-carboxylate) and the mixture heated for 2 hours on a steam bath. After this time the reaction product was a brown liquid.

The following two mixtures were then prepared:

Mixture A

|  | G. |
|---|---|
| 3,4 - dihydro - 2H - pyran-2-methyl-(3,4-dihydro-2H-pyran-2-carboxylate) | 10 |
| Monoethylenically unsaturated compound | 10 |
| Siloxane oxyalkylene copolymer type silicone surfactant | 0.2 |
| Trichloromonofluoromethane | 4 |

Mixture B

|  | |
|---|---|
| Boron trifluoride 10% in diethylene glycol | 1 |

Mixture A was added to Mixture B with rapid stirring. After 65 seconds foaming commenced. A light brown rigid foam was formed.

EXAMPLES 70 TO 74

A series of five foams were prepared containing di-(2-ethylhexyl)maleate and different vinyl ethers using the following procedure. The vinyl ether, di-(2-ethylhexyl) maleate, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table X.

EXAMPLE 75

A foaming composition was prepared by mixing the following ingredients:

|  | G. |
|---|---|
| Tris-(3,4-dihydro-2H-pyran-2-methyl) phosphate | 10 |
| Bis-(3,4-dihydro-2H-pyran-2-methyl) adipate | 10 |
| Di-(2-ethylhexyl) maleate | 5 |
| Siloxane oxyalkylene copolymer type silicone surfactant | 0.5 |
| Trichloromonofluoromethane | 5 |

TABLE IX

| Example | Crude 3,4-dihydro-2H-pyran-2-methyl (3,4-dihydro-2H-pyran-2-carboxylate, g. | Mono ethylenically unsaturated compound | Siloxane oxyalkylene type silicone surfactant, g. | Trichloromono-fluoromethane, g. | Boron trifluoride 10% in diethylene glycol, g. | Induction period, secs. | Density, lbs./cu. ft. |
|---|---|---|---|---|---|---|---|
| 64 | 200 | Dibutyl maleate, 100 g | 1 | 50 | 10 | 320 | 3.7 |
| 65 | 200 | Vinyl stearate, 75 g | 1 | 50 | 7 | 60 | 2.5 |
| 66 | 400 | Styrene, 100 g | 1 | 110 | 18 | 225 | 3.1 |
| 67 | 400 | 1-decene, 80 g | 2 | 110 | 20 | 175 | 1.2 |
| 68 | 400 | n-Butyl acrylate, 90 g | 2 | 110 | 8 | 170 | 1.9 |

TABLE X

| Example | Vinyl Ether | Di-(2-ethylhexyl) maleate, g. | Siloxane oxyalkylene copolymer type surfactant, g. | Trichloro-monofluoro-methane, g. | Boron trifluoride 10% in diethylene glycol, ml. | Induction period, sec. | Rise period, sec. | Height, in. |
|---|---|---|---|---|---|---|---|---|
| 70 | 3,4-dihydro-2H-pyran-2-methyl-(3,4-dihydro-2H-pyran-2-carboxylate), 20 g. | 5 | 0.5 | 5 | 0.5 | 260 | 40 | 9.5 |
| 71 | Bis-(3,4-dihydro-2H-pyran-2-methyl) adipate, 20 g. | 5 | 0.5 | 5 | 1.5 | 60 | 10 | 7.25 |
| 72 | Bis-(3,4-dihydro-2H-pyran-2-methyl) succinate, 20 g. | 5 | 0.5 | 5 | 1.5 | 35 | 10 | 7.25 |
| 73 | Bis-(3,4-dihydro-2H-pyran-2-methyl) azelate, 20 g | 5 | 0.5 | 5 | 1.5 | 120 | 10 | 4.5 |
| 74 | Bis-(3,4-dihydro-2H-pyran-2-methyl) sebacate, 20 g. | 5 | 0.5 | 5 | 1.5 | 135 | 15 | 4 | and then adding with additional stirring 1.5 ml. of a solution containing 10% by weight of boron trifluoride in diethylene glycol. The composition was poured into a 250 ml. paper cup where after an induction period of 50 seconds it rose for 15 seconds to form a foam 3.5 in. high. The foam was tough and resilient with medium sized cells and a light coloured resilient interior.

EXAMPLE 76

10 g. of 2-(2-formyl-3,4-dihydro-1,2-pyranyl)-2-3,4-dihydro-1,2-pyranyl) carbinol were mixed with 3 g. of the benzoate of 2-hydroxymethyl-3,4-dihydro-2H-pyran and 0.1 g. of siloxane oxyalkylene copolymer type silicone surfactant using a high speed stirrer. After 2 minutes of stirring 2 g. of trichloromonofluoromethane and 0.1 g. of a solution containing 10% by weight of fluoboric acid in diethylene glycol were added. The mixture was poured into a mould where it foamed to form a white friable foam.

EXAMPLES 77 TO 82

A series of foams were produced in the following manner: A mixture comprising crude 3,4-dihydro-2H-pyran-2-methyl-(3,4-dihydro-2H-pyran-2-carboxylate), phenol, the monoethylenically unsaturated compound, the surfactant and the trichloromonofluoromethane foaming agent was first prepared. The boron trifluoride catalyst was added to this mixture while stirring with a mechanical stirrer. After 5 seconds the composition was poured into a mould. Table XI describes the foaming compositions and the resulting foams.

*Mixture A—Continued*

| | G. |
|---|---|
| Siloxane oxyalkylene copolymer type silicone surfactant | 1 |
| Trichloromonofluoromethane | 50 |
| Trimethoxy boroxine | 1 |

*Mixture B*

Boron trifluoride 10% in diethylene glycol _____ 6

Mixture B was added to Mixture A with mechanical stirring. After 5 seconds of mixing, the composition was poured into a mould. Foaming commenced after 20 seconds. A light coloured foam of fine texture and having a density of 2.8 lbs./cu. ft. resulted.

EXAMPLE 85

A polymerizable monoethylenically unsaturated compound was prepared as follows: 0.75 g. of p-toluene sulphonic acid was dissolved in 130 g. of 2-ethylhexanol. This solution was added to 225 g. of distilled 3,4-dihydro-2H - pyran - 2-methyl-(3,4-dihydro-2H-pyran-2-carboxylate) and the mixture heated for 2 hours on a steam bath. After this time, the reaction product was a brown liquid.

The following two mixtures were then prepared:

*Mixture A*

| | G. |
|---|---|
| Ethylenically unsaturated compound | 60 |
| 3,4 - dihydro - 2H-pyran-2-methyl-(3,4-dihydro-2H-pyran-2-carboxylate) | 126 |

TABLE XI

| Example | Crude 3,4-Dihydro-2H-pyran-2-methyl (3,4-dihydro-2H-pyran-2-carboxylate, g. | Phenol, g. | Mono ethylenically unsaturated compound | Siloxane oxyalkylene copolymer type silicone surfactant, g. | Boron trifluoride 10% in diethylene glycol, g. | Trichloromonofluoromethane, g. | Induction period, sec. | Density, lbs./cu. ft. |
|---|---|---|---|---|---|---|---|---|
| 77 | 400 | 50 | Dibutyl maleate, 200 g. | 2 | 16 | 110 | 35 | 2.5 |
| 78 | 200 | 25 | Styrene 75 g. | 0.5 | 9 | 55 | 35 | 1.2 |
| 79 | 200 | 25 | 1-decene, 60 g. | 1 | 10 | 55 | 35 | 2.5 |
| 80 | 200 | 25 | Lauryl vinyl ether, 50 g. | 1 | 6 | 55 | 12 | 3.7 |
| 81 | 200 | 25 | Vinyl stearate, 75 g. | 1 | 4 | 55 | 35 | 2.5 |
| 82 | 400 | 50 | n-Butyl acrylate, 100 g. | 2 | 8 | 110 | 60 | 1.9 |

EXAMPLE 83

The following two mixtures were prepared:

*Mixture A*

| | G. |
|---|---|
| Crude 3,4-dihydro-2H-pyran-2-methyl-(3,4-dihydro-2H-pyran-2-carboxylate) | 200 |
| 2,2-di-p-hydroxyphenylpropane | 50 |
| Vinyl stearate | 50 |
| Siloxane oxyalkylene copolymer type silicone surfactant | 1 |
| Trichloromonofluoromethane | 50 |

*Mixture B*

Boron trifluoride 10% in diethylene glycol _____ 3.8

Mixture B was added to Mixture A with mechanical stirring. After 5 seconds of mixing the composition was poured into a mould. Foaming commenced after 20 seconds. A white foam of fine texture and having a density of 2.5 lbs./cu. ft. resulted.

EXAMPLE 84

The following two mixtures were prepared:

*Mixture A*

| | G. |
|---|---|
| Crude 3,4-dihydro-2H-pyran-2-methyl-(3,4-dihydro-2H-pyran-2-carboxylate) | 200 |
| Novolak resin | 50 |
| Styrene | 50 |
| 2:2-di-p-hydroxyphenylpropane | 14 |
| Siloxane oxyalkylene copolymer type silicone surfactant | 1 |
| Trichloromonofluoromethane | 40 |
| Mixture of polyvinylchloride and antimony oxide (Niax Flame-retardant A) | 30 |

*Mixture B*

Boron trifluoride 10% in diethylene glycol _____ 5

Mixture B was added to Mixture A with stirring. After an induction period of 30 seconds foaming commenced. The foam had a very fine texture, was light in colour, had a density of 2.9 lbs./cu. ft. and was self-extinguishing by ASTM 1692–59–T.

EXAMPLE 86

Diethylene glycol-trimethylolpropane maleate was prepared by heating under reflux at 160°–170° C. in toluene solution, one mole each of diethylene glycol, trimethylol propane and maleic anhydride. Heating was continued until the esterification reaction ceased to produce water.

A foaming composition containing the following ingredients was prepared:

| | |
|---|---|
| Butanediol - 1,4 - bis-(3,4-dihydro-2H-pyran-2-yl) ether _____g__ | 15 |
| 2:2-di-p-hydroxyphenyl propane _____g__ | 5 |
| Diethylene-glycol-trimethylolpropane maleate _g__ | 5 |
| Trichloromonofluoromethane _____g__ | 5 |
| Siloxane oxyalkylene copolymer type silicone surfactant _____g__ | 0.1 |
| Boron trifluoride, 10% in diethylene glycol ___ml__ | 0.25 |

The first five ingredients were mixed for 10 seconds and the boron trifluoride catalyst was then added with additional stirring. After an induction period of 2.7 minutes a soft foam was obtained.

EXAMPLE 87

The benzoate of 2-hydroxymethyl-3,4-dihydro-2H-pyran was prepared by esterification of 3,4-dihydro-2H-pyran-2-methanol with benzoyl chloride.

A foaming composition containing the following ingredients was prepared:

| | |
|---|---|
| Butanediol - 1,4 - bis-(3,4-dihydro-2H-pyran-2-yl) ether _____ g__ | 15 |
| 2:2-di-p-hydroxyphenyl propane _____ g__ | 5 |
| The benzoate of 2-hydroxymethyl-3,4-dihydro-2H-pyran _____ g__ | 5 |
| Trichloromonofluoromethane _____ g__ | 5 |
| Siloxane oxyalkylene copolymer type silicone surfactant _____ g__ | 0.1 |
| Boron trifluoride, 10% in diethylene glycol ____ml__ | 0.2 |

The first five ingredients were mixed for 10 seconds and the boron trifluoride catalyst was then added with additional stirring. After an induction period of 42 seconds a rigid foam with hard skin was obtained.

EXAMPLES 88 TO 92

A series of five foams were prepared containing 2:2-di-p-hydroxyphenyl propane, di-(2-ethyl-hexyl) maleate and different vinyl ethers using the following procedure. The vinyl ether, 2:2-di-p-hydroxyphenyl propane, di-(2-ethylhexyl) maleate, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table XII.

EXAMPLE 94

The following two mixtures were prepared:

Mixture A

| | G. |
|---|---|
| Crude 3,4-dihydro-2H-pyran-2-methyl-(3,4-dihydro-2H-pyran-2-carboxylate) _____ | 200 |
| Dibutyl maleate _____ | 50 |
| Siloxane oxyalkylene copolymer type silicone surfactant _____ | 5 |
| Trichloromonofluoromethane _____ | 50 |

Mixture B

| | |
|---|---|
| Polypropylene glycol molecular weight 2025 _____ | 200 |
| Trichloromonofluoromethane _____ | 50 |
| Boron trifluoride _____ | 7.5 |
| 48% as etherate p-toluenesulphonic acid, 10% in ethyl acetate _____ | 10 |

Mixture B was added to Mixture A with mechanical stirring. After 5 seconds of mixing, the composition was poured into a mould. Foaming commenced after 61 seconds. A light coloured foam of fine texture and having a density of 2.7 lbs./cu. ft. resulted.

EXAMPLE 95

The following two mixtures were prepared:

Mixture A

| | G. |
|---|---|
| Crude 3,4-dihydro-2H-pyran-2-methyl-(3,4-dihydro-2H-pyran-2-carboxylate) _____ | 200 |
| Styrene _____ | 50 |
| Siloxane oxyalkylene copolymer type silicone surfactant _____ | 5 |
| Trichloromonofluoromethane _____ | 50 |

Mixture B

| | |
|---|---|
| Polypropylene glycol molecular weight 2025 _____ | 200 |
| Trichloromonofluoromethane _____ | 50 |
| Boron trifluoride 48% as etherate _____ | 7.5 |
| p-Toluenesulphonic acid 20% in ethyl acetate ____ | 5 |

TABLE XII

| Ex. | Vinyl Ether | 2:2-di-p-hydroxyphenyl propane, g. | Di-(2-ethyl-hexyl) maleate, g. | Siloxane Oxyalkylene copolymer type surfactant, g. | Trichloro-monofluoro-methane, g. | Boron trifluoride 10% in diethylene glycol, ml. | Induction period, sec. | Rise period, sec. | Height, in. |
|---|---|---|---|---|---|---|---|---|---|
| 88 | 3,4-dihydro-2H-pyran-2-methyl-(3,4-dihydro-2H-pyran-2-carboxylate), 20 g. | 5 | 5 | 0.5 | 5 | 0.5 | 30 | 20 | 9.75 |
| 89 | Bis-(3,4-dihydro-2H-pyran-2-methyl) adipate, 20 g. | 5 | 5 | 0.5 | 5 | 0.5 | 40 | 25 | 7.75 |
| 90 | Bis-(3,4-dihydro-2H-pyran-2-methyl) succinate 20 g. | 5 | 5 | 0.5 | 5 | 0.5 | 90 | 30 | 4.75 |
| 91 | Bis-(3,4-dihydro-2H-pyran-2-methyl) azelate, 20 g. | 5 | 5 | 0.5 | 5 | 0.7 | 80 | 10 | 3 |
| 92 | Bis-(3,4-dihydro-2H-pyran-2-methyl) sebacate, 20 g. | 5 | 5 | 0.5 | 5 | 1.0 | 100 | 30 | 2.75 |

EXAMPLE 93

The following foaming composition was prepared:

| | |
|---|---|
| Tetravinyl ether polypropoxylated pentaerythritol _____ g__ | 15 |
| 2:2-di-p-hydroxyphenyl propane _____ g__ | 5 |
| The benzoate of 2-hydroxymethyl-3,4-dihydro-2H pyran _____ g__ | 5 |
| Trichloromonofluoromethane _____ g__ | 5 |
| Siloxane oxyalkylene copolymer type silicone surfactant _____ g__ | 0.1 |
| Boron trifluoride, 2% in diethylene glycol ____ml__ | 0.25 |

The first five ingredients were mixed together for 10 seconds and then the boron trifluoride catalyst was added with additional stirring. The composition foamed after an induction period of 36 seconds to produce a flexible soft weak foam.

Mixture B was added to Mixture A with mechanical stirring. After 5 seconds of mixing the composition was poured into a mould. Foaming commenced after 27 seconds. A dark coloured foam of fine texture and having a density of 2.4 lbs./cu. ft. resulted.

EXAMPLE 96

The following two mixtures were prepared:

Mixture A

| | G. |
|---|---|
| Crude 3,4-dihydro-2H-pyran-2-methyl-(3,4-dihydro-2H-pyran-2-carboxylate) _____ | 200 |
| Vinyl propionate _____ | 30 |
| 1,2,6-hexanetriol _____ | 30 |
| Siloxane oxalkylene copolymer type silicone surfactant _____ | 1 |

23

Mixture B

| | G. |
|---|---|
| Boron trifluoride 10% in polypropylene glycol | 15 |
| p-Toluenesulphonic acid, 20% in ethyl acetate | 10 |
| Trichloromonofluoromethane | 50 |

Mixture B was added to Mixture A with mechanical stirring. After 10 seconds of mixing, the composition was poured into a mould. Foaming commenced after 50 seconds. A dark coloured foam was obtained which had a density of 0.9 lbs./cu. ft.

EXAMPLE 97

The following two mixtures were prepared:

Mixture A

| | G. |
|---|---|
| Crude 3,4-dihydro-2H-pyran-2-methyl-(3,4-dihydro-2H-pyran-2-carboxylate) | 200 |
| Isobutyl vinyl ether | 30 |
| Polyol condensate derived from pentaerythritol and propylene oxide (Pluracol P.E.P. 500) | 100 |
| Siloxane oxyalkylene copolymer type silicone surfactant | 1 |

Mixture B

| | G. |
|---|---|
| Boron trifluoride 48% as etherate | 3.5 |
| p-Toluenesulphonic acid 10% in ethyl acetate | 5 |
| Trichloromonofluoromethane | 50 |

Mixture B was added to Mixture A with mechanical stirring. After 5 seconds of mixing, the composition was poured into a mould. Foaming commenced after 28 seconds. A dark coloured foam of fine even texture and having a density of 1.9 lbs./cu. ft. resulted.

EXAMPLE 98

The following two mixtures were prepared:

Mixture A

| | G. |
|---|---|
| Crude 3,4-dihydro-2H-pyran-2-methyl-(3,4-dihydro-2H-pyran-2-carboxylate) | 200 |
| 1-decene | 30 |
| Polyol condensate derived from pentaerythritol and propylene oxide (Pluracol P.E.P. 500) | 100 |
| Siloxane oxyalkylene copolymer type silicone surfactant | 1 |

Mixture B

| | G. |
|---|---|
| Boron trifluoride 48% as etherate | 6 |
| p-Toluenesulphonic acid 10% in ethyl acetate | 8 |
| Trichloromonofluoromethane | 50 |

Mixture B was added to Mixture A with mechanical stirring. After 5 seconds of mixing, the composition was poured into a mould. Foaming commenced after 64 seconds. A dark coloured foam of fine even texture and having a density of 1.7 lbs./cu. ft. resulted.

EXAMPLE 99

The following two mixtures were prepared:

Mixture A

| | G. |
|---|---|
| Crude 3,4-dihydro-2H-pyran-2-methyl-(3,4-dihydro-2H-pyran-2-carboxylate) | 200 |
| 2-ethylhexyl acrylate | 30 |
| Siloxane oxyalkylene copolymer type silicone surfactant | 2 |
| Trichloromonofluoromethane | 30 |

Mixture B

| | G. |
|---|---|
| Di (5-hydroxypentyl) phthalate | 100 |
| Trichloromonofluoromethane | 50 |
| Boron trifluoride 48% as etherate | 8 |
| p-Toluenesulphonic acid, 20% in ethyl acetate | 6 |

Mixture B was added to Mixture A with mechanical stirring. After 15 seconds of mixing, the composition was poured into a mould. Foaming commenced after 70 seconds. A dark coloured foam of fine texture and having a density of 1.9 lbs./cu. ft. resulted.

EXAMPLES 100 TO 104

A series of five foams were prepared containing polypropylene glycol of molecular weight of 2025, di-(2-ethylhexyl) maleate and different vinyl ethers using the following procedure. The vinyl ether, polypropylene glycol and di-(2-ethylhexyl) maleate, the siloxane oxyalkylene copolymer type silicone surfactant and the trichloromonofluormethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table XIII.

EXAMPLES 105 TO 110

A mixture was prepared consisting of crude 3,4-dihydro-2H-pyran-2-methyl-(3,4-dihydro-2H-2-carboxylate), the monoethylenically unsaturated compound, the material containing one or more epoxide groups per molecule, the siloxane oxyalkylene copolymer type silicone surfactant, the trichloromonofluoromethane foaming agent and the trimethoxy boroxine catalyst. The boron trifluoride catalyst was added to this mixture while stirring with a mechanical stirrer. After 10 seconds the composition was poured into a mould. Table XIV describes the foaming compositions and the resulting foams.

TABLE XIII

| Ex. | Vinyl Ether | Polypropylene glycol M.W. 2025, g. | Di-(2-ethylhexyl) maleate, g. | Siloxane oxyalkylene copolymer type silicone surfactant, g. | Trichloromonofluoromethane, g. | Boron trifluoride 10% in diethylene glycol, ml. | Induction period, sec. | Rise period, sec. | Height, in. |
|---|---|---|---|---|---|---|---|---|---|
| 100 | 3,4-dihydro-2H-pyran-2-methyl-(3,4-dihydro-2H-pyran-2-carboxylate, 20 g. | 7 | 5 | 0.5 | 5 | 1.5 | 230 | 20 | 5.75 |
| 101 | Bis-(3,4-dihydro-2H-pyran-2-methyl) adipate, 20 g. | 7 | 5 | 0.5 | 5 | 2.0 | 85 | 10 | 4.25 |
| 102 | Bis-(3,4-dihydro-2H-pyran-2-methyl) succinate, 20 g. | 7 | 5 | 0.5 | 5 | 2.0 | 60 | 10 | 6.25 |
| 103 | Bis-(3,4-dihydro-2H-pyran-2-methyl) azelate, 20 g. | 7 | 5 | 0.5 | 5 | 2.0 | 150 | 15 | 3.25 |
| 104 | Bis-(3,4-dihydro-2H-pyran-2-methyl) sebacate 20 g. | 7 | 5 | 0.5 | 5 | 2.0 | 160 | 15 | 2.75 |

TABLE XIV

| Ex. | Crude 3,4-dihydro-2H-pyran-2-methyl-(3,4-dihydro-2H-pyran-2-carboxylate, g. | Epoxide | Monoethylenically unsaturated compound | Siloxane oxyalkylene copolymer type silicone surfactant, g. | Trichloromonofluoromethane, g. | 10% boron trifluoride in diethylene glycol, g. | Trimethoxy boroxine, g. | Induction time, sec. | Density, lbs./cu. ft. |
|---|---|---|---|---|---|---|---|---|---|
| 105 | 200 | Resinous condensate of epichlorohydrin and 2:2-di-p-hydroxyphenyl propane, 50 g. | Butyl vinyl ether, 50 g. | 0.5 | 50 | 7 | 1 | 23 | 2.9 |
| 106 | 200 | Epichlorohydrin, 50 g. | Styrene, 30 g. | 0.5 | 50 | 8 | | 95 | 3.4 |
| 107 | 200 | Poly allyl glycidyl ether, 50 g. | Dibutyl maleate, 30 g. | 1 | 50 | 6 | | 75 | 2.7 |
| 108 | 200 | Poly allyl glycidyl ether, 50 g. | Vinyl propionate, 25 g. | 1 | 50 | 7 | | 90 | 1.9 |
| 109 | 200 | Resinous condensate of epichlorohydrin and a phenol formaldehyde resin, 50 g. | 1-decene, 25 g. | 1 | 50 | 6 | | 46 | 1.9 |
| 110 | 200 | As Example 5, 50 g. | n-Butyl acrylate, 30 g. | 1 | 50 | 6 | | 92 | 2.4 |

These foams have good tough skins and are light coloured and of fine cell structure.

EXAMPLES 111 to 117

A series of seven foams were prepared containing a high viscosity epoxidized olefin ("Oxiron" 2000), di-(2-ethylhexyl) maleate and different vinyl ethers using the following procedure. The vinyl ether, the epoxidized polyolefin, di-(2-ethylhexyl) maleate, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table XV.

EXAMPLE 119

The following foaming composition was prepared:

Butanediol-1,4-divinyl ether _____g__ 10
The benzoate of 2-hydroxymethyl-3,4-dihydro-2H-pyran _____g__ 5
Low molecular weight resinous condensate of epichlorohydrin and 2:2-di-p-hydroxyphenyl propane _____g__ 10
Trichloromonofluoromethane _____g__ 5
Siloxane oxyalkylene copolymer type silicone surfactant _____g__ 0.1
Boron trifluoride, 5% in diethylene glycol ____ml__ 0.15

The first five ingredients were mixed together for 10 seconds and then the boron trifluoride catalyst was added with additional stirring. After an induction period of 12 seconds the composition foamed to form a white flexible weak foam.

TABLE XV

| Ex. | Vinyl Ether | High viscosity epoxidized polyolefin, g. | Di-(2-ethyl hexyl) maleate, g. | Siloxane oxyalkylene copolymer type silicone surfactant, g. | Trichloromonofluoromethane, g. | Boron trifluoride 10% in diethylene glycol, ml. | Induction period, sec. | Rise period, sec. | Height, in. |
|---|---|---|---|---|---|---|---|---|---|
| | 3,4-dihydro-2H-pyran-2-methyl-(3,4-dihydro-2H-pyran-2-carboxylate): | | | | | | | | |
| 111 | 20 g. | 5 | 5 | 0.5 | 5 | 0.5 | 10 | 30 | 2 |
| 112 | 20 g. | 5 | 5 | 0.5 | 5 | 0.8 | 10 | 20 | 4 |
| 113 | Bis-(3,4-dihydro-2H-pyran-2-methyl) adipate: 20 g. | 5 | 5 | 0.5 | 5 | 1.0 | 10 | 10 | 6.25 |
| 114 | Bis-(3,4-dihydro-2H-pyran-2-methyl) succinate: 20 g. | 5 | 5 | 0.5 | 5 | 1.0 | 7 | 15 | 8.5 |
| 115 | Bis-(3,4-dihydro-2H-pyran-2-methyl) azelate: 20 g. | 5 | 5 | 0.5 | 5 | 1.0 | 10 | 15 | 5.75 |
| 116 | Bis-(3,4-dihydro-2H-pyran-2-methyl) sebacate: 20 g. | 5 | 5 | 0.5 | 5 | 1.0 | 10 | 10 | 4.75 |
| 117 | Bis-(3,4-dihydro-2H-pyran-2-methyl) fumarate: 10 g. | 3 | 3 | 0.5 | 5 | 0.6 | 15 | 25 | 4.25 |

EXAMPLE 118

The following foaming composition was prepared:

Butanediol-1,4-divinyl ether _____g__ 10
Diethylene glycol-trimethylolpropane maleate __g__ 5
Low molecular weight resinous condensation product of epichlorohydrin and 2:2-di-p-hydroxyphenyl propane _____g__ 10
Trichloromonofluoromethane _____g__ 5
Siloxane oxyalkylene copolymer type silicone surfactant _____g__ 0.1
Boron trifluoride, 5% in diethylene glycol ____ml__ 0.15

The first five ingredients were mixed together for 10 seconds and then the boron trifluoride catalyst was added with additional stirring. After an induction period of 15 seconds the composition foamed to form a white flexible weak foam.

EXAMPLE 120

The foaming composition containing the following ingredients was prepared:

Butanediol - 1,4 - bis - (3,4-dihydro-2H-pyran-2-yl)-ether _____g__ 10
Low molecular weight resinous condensate of epichlorohydrin and 2:2-di-p-hydroxyphenyl propane _____g__ 10
The benzoate of 2-hydroxymethyl-3,4-dihydro-2H-pyran _____g__ 5
Trichloromonofluoromethane _____g__ 5
Siloxane oxyalkylene copolymer type silicone surfactant _____g__ 0.1
Boron trifluoride, 20% in diethylene glycol ____ml__ 0.2

The first five ingredients were mixed together for 10 seconds and then the boron trifluoride catalyst was added with additional stirring. After an induction period of 1.4 minutes a rigid brittle foam was obtained.

EXAMPLE 121

The foaming composition containing the following ingredients was prepared:

| | |
|---|---|
| Butanediol - 1,4 - bis-(3,4-dihydro-2H-pyran-2-yl)ether _____ g__ | 10 |
| Low molecular weight resinous condensate of epichlorohydrin and 2:2-di-p-hydroxyphenyl propane _____ g__ | 10 |
| Diethylene glycol-trimethylolpropane maleate __g__ | 4 |
| Trichloromonofluoromethane _____ g__ | 5 |
| Siloxane oxyalkylene copolymer type silicone surfactant _____ g__ | 0.1 |
| Boron trifluoride, 20% in diethylene glycol ___ml__ | 0.25 |

The first five ingredients were mixed together for 10 seconds and then the boron trifluoride catalyst was added with additional stirring. After an induction period of 2.4 minutes of a dark foam was obtained.

EXAMPLE 122

The following foaming composition was prepared:

| | |
|---|---|
| Divinyl ether of polypropylene glycol of molecular weight 425 _____ g__ | 10 |
| Diethylene glycol-trimethylolpropane maleate ___g__ | 2 |
| Low molecular weight resinous condensation product of epichlorohydrin and 2:2-di-p-hydroxyphenyl propane _____ g__ | 12 |
| Trichloromonofluoromethane _____ g__ | 5 |
| Siloxane oxyalkylene copolymer type silicone surfactant _____ g__ | 0.1 |
| Boron trifluoride, 10% in diethylene glycol ____ml__ | 0.2 |

The first five ingredients were mixed together for 10 seconds and then the boron trifluoride catalyst was added with additional stirring. After an induction period of 6 seconds the composition foamed to form a flexible weak foam.

EXAMPLE 123

The following foaming composition was prepared:

| | |
|---|---|
| Divinyl ether of polypropylene glycol of molecular weight 425 _____ g__ | 6 |
| The benzoate of 2-hydroxymethyl-3,4-dihydro-2H-pyran _____ g__ | 4 |
| Low molecular weight resinous condensation product of epichlorohydrin and 2:2-di-p-hydroxyphenyl propane _____ g__ | 15 |
| Trichloromonofluoromethane _____ g__ | 5 |
| Siloxane oxyalkylene copolymer type silicone surfactant _____ g__ | 0.1 |
| Boron trifluoride, 10% in diethylene glycol ___ml__ | 0.15 |

The first five ingredients were mixed together for 10 seconds and then the boron trifluoride catalyst was added with additional stirring. After an induction period of 12 seconds the composition foamed to form a flexible weak foam.

EXAMPLE 124

The following foaming composition was prepared:

| | |
|---|---|
| Trivinyl ether of propoxylated phenolaldehyde condensate _____ g__ | 8 |
| Diethylene glycol-trimethylolpropane maleate ___g___ | 4 |
| Low molecular weight resinous condensate of epichlorohydrin and 2:2-di-p-hydroxyphenyl propane _____ g__ | 12 |
| Trichloromonofluoromethane _____ g__ | 12 |
| Siloxane oxyalkylene copolymer type silicone surfactant _____ g__ | 0.1 |
| Boron trifluoride, 10% in diethylene glycol ____ml__ | 0.4 |

The first five ingredients were mixed together for 10 seconds and then the boron trifluoride catalyst was added with additional stirring. The composition foamed to form a flexible weak foam.

EXAMPLE 125

The following foaming composition was prepared:

| | |
|---|---|
| Trivinyl ether of propoxylated phenolaldehyde condensate _____ g__ | 8 |
| The benzoate of 2-hydroxymethyl-3,4-dihydro-2H-pyran _____ g__ | 4 |
| Low molecular weight viscous condensate of epichlorohydrin and 2:2-di-p-hydroxy-phenyl propane _____ g__ | 12 |
| Trichloromonofluoromethane _____ g__ | 10 |
| Siloxane oxyalkylene copolymer type silicone surfactant _____ g__ | 0.1 |
| Boron trifluoride, 10% in diethylene glycol ___ml__ | 0.4 |

The first five ingredients were mixed together for 10 seconds and then the boron trifluoride catalyst was added with additional stirring. The composition foamed to form a flexible weak foam.

EXAMPLE 126

A foaming composition was prepared by mixing the following ingredients:

| | |
|---|---|
| Tris-(3,4-dihydro-2H-pyran-2-methyl)phosphate _____ g__ | 10 |
| Bis-(3,4-dihydro-2H-pyran-2-methyl)adipate ___g___ | 10 |
| High viscosity epoxidized polyolefin ("Oxiron" 2000) _____ g__ | 5 |
| Di-(2-ethylhexyl) maleate _____ g__ | 5 |
| Siloxane oxyalkylene copolymer type silicone surfactant _____ g__ | 0.5 |
| Trichloromonofluoromethane _____ g__ | 5 | and then adding with additional stirring 1.5 ml. of a solution containing 10% by weight of boron trifluoride in diethylene glycol. The composition was poured into a 250 ml. paper cup whereafter an induction period of 5 seconds it rose for 20 seconds to form a foam 2.5 inches high. The foam was hard and tough with white skin and dark hard interior.

EXAMPLES 127 TO 134

A series of eight foams was prepared containing toluene-2,4-[bis-(3',4'-dihydro - 2'H-pyran-2'-methyl)carbamate] and the other additives using the following procedure. The toluene-2,4-[bis-(3',4'-dihydro-2'H-pyran-2'-methyl)carbamate], the additive, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the time of rise of the foam and the height of the foam after rise were measured. The compositions and characteristics of the resulting foams are given in Table XVI.

TABLE XVI

| Example | Toluene-2,4-[bis-(3',4'-dihydro-2'H-pyran-2'-methyl) carbamate], g. | Additive | Siloxane oxyalkylene copolymer type silicone surfactant, g. | Trichloromonofluoromethane, g. | Borontrifluoride 10% in diethylene glycol, ml. | Induction period, secs. | Rise time, secs. | Height, inches |
|---|---|---|---|---|---|---|---|---|
| 127 | 10 | Bis-(3,4-dihydro-2H-pyran-2-methyl) adipate: 10 g. | 0.5 | 5 | 1.0 | 10 | 50 | 8 |
| 128 | 10 | Bis-(3,4-dihydro-2H-pyran-2-methyl) azelate: 10 g. | 0.5 | 5 | 1.0 | 10 | 70 | 7.5 |
| 129 | 10 | Bis-(3,4-dihydro-2H-pyran-2-methyl) sebacate: 10 g. | 0.5 | 5 | 1.0 | 15 | 60 | 7.5 |
| 130 | 20 | 3,4-dihydro-2H-pyran-2-methanol: 10 g. | 0.5 | 7 | 1.3 | 5 | 7 | 9.5 |
| 131 | 20 | 4.5 g. | 0.5 | 5 | 0.8 | 10 | 45 | 7 |
| 132 | 10 | 3,4-dihydro-2H-pyran-2-methyl-(3,4-dihydro-2H-pyran-2-carboxylate): 10 g. | 0.5 | 5 | 0.6 | 35 | 95 | 6 |
| 133 | 10 | 10 g. | 0.5 | 5 | 1.0 | 35 | 60 | 10 |
| 134 | 10 | 10 g. | 0.5 | 5 | 1.3 | 20 | 25 | 10 |

EXAMPLE 135

The following ingredients:

| | G. |
|---|---|
| 3,4-dihydro-2H-pyran - 2-methyl - (3,4 - dihydro-2H-pyran-2-carboxylate) | 14 |
| Dioctyl phthalate | 6 |
| Siloxane oxyalkylene copolymer type silicone surfactant | 2 |
| Trichloromonofluoromethane | 7 | were mixed together and then 2 g. of a solution containing 10% by weight of boron trifluoride etherate in glycol were added with additional stirring. After an induction period of 90 seconds, the composition foamed to give a highly expanded foam of uniform structure and large pore size.

What we claim is:

1. A foamed cellular polymeric material which is the reaction product of a foamable composition comprising:
   (A) at least one polymerizable cyclic vinyl ether of the generic formula

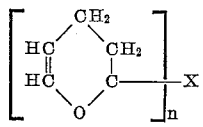

wherein $n$ is an integer having a value of at least two, R is a member selected from the group consisting of the hydrogen atom and the carboxaldehyde radical, and X is a linking group having a valence equal to $n$;
   (B) an acidic catalyst capable of promoting the polymerization of said vinyl ether and selected from the group consisting of strong proton-donating acids and Lewis acids; and
   (C) a foaming agent vaporizing at the temperature of polymerization of said vinyl ether.

2. A foamed cellular polymeric material as claimed in claim 1 wherein the foamable composition contains a material reactive with the ethylenic double bonds of its vinyl ether ingredient.

3. A foamed cellular polymeric material as claimed in claim 2 wherein the material reactive with the ethylenic double bonds of the vinyl ether ingredient of the foamable composition is a member selected from the group consisting of
   (D) compatible aliphatic and aromatic polyamides;
   (E) compatible polycarbamates obtained by the condensation of polyisocyanates with aliphatic polyols;
   (F) alpha, beta-monoethylenically unsaturated monomers copolymerizable with said vinyl ether;
   (G) mixtures of (F) with compatible phenolic compounds; and
   (H) mixtures of (F) with compatible aliphatic monohydric or polyhydric alcoholic compounds; and
   (I) mixtures of (F) with compatible epoxidized materials containing at least one epoxide group per molecule.

4. A foamed cellular polymeric material as claimed in claim 3 wherein the proportions of the ingredients of the foamable composition are such that:
   (D) the number of amido groups provided by the polyamide is less than 10% of the number of —CH=CH— groups provided by the vinyl ether;
   (E) the number of carbamate groups provided by the polycarbamate is less than 75% of the number of —CH=CH— groups provided by the vinyl ether;
   (F) the number of ethylenic groups provided by the monoethylenically unsaturated compound is not more than three times the number of —CH=CH— groups provided by the vinyl ether;
   (G) the combined number of ethylenic and hydroxyl groups provided by the monoethylenically unsaturated and phenolic compounds, respectively, ranges from less than 75% of the number of —CH=CH— groups provided by the vinyl ether when the amount of phenolic compound exceeds that of monoethylenically unsaturated compound, to not more than three times the number of —CH=CH— groups provided by the vinyl ether when the amount of monoethylenically unsaturated compound exceeds that of phenolic compound;
   (H) the combined number of ethylenic and hydroxyl groups provided by the monoethylenically unsaturated and alcoholic compounds, respectively, ranges from less than 75% of the number of —CH=CH— groups provided by the vinyl ether when the amount of alcoholic compound exceeds that of monoethylenically unsaturated compound, to not more than three times the number of —CH=CH— groups provided by the vinyl ether when the amount of monoethylenically unsaturated compound exceeds that of alcoholic compound; and
   (I) the number of ethylenic groups provided by the monoethylenically unsaturated compound is not more than three times the combined number of —CH=CH— and epoxide groups provided by the vinyl ether and epoxidized material, respectively.

5. A foamed cellular polymeric material as claimed in claim 1 wherein the foamable composition comprises 3,4-dihydro-2H-pyran-2-methyl-(3,4-dihydro-2H - pyran-2-carboxylate) as a vinyl ether ingredient.

6. A foamed cellular polymeric material as claimed in claim 2 wherein the foamable composition comprises 3,4-dihydro-2H-pyran-2-methyl-(3,4-dihydro - 2H-pyran-2-carboxylate) as a vinyl ether ingredient.

7. A foamed cellular polymeric material as claimed in claim 3 wherein the foamable composition comprises 3,4 - dihydro-2H-pyran-2-methyl-(3,4-dihydro-2H-pyran-2-carboxylate) as a vinyl ether ingredient.

8. A foamed cellular polymeric material as claimed in claim 4 wherein the foamable composition comprises 3,4-dihydro-2H-pyran-2-methyl-(3,4-dihydro-2H-pyran-2-carboxylate) as a vinyl ether ingredient.

9. A foamed cellular polymeric material as claimed in claim 1 wherein the foamable composition comprises bis(3,4-dihydro-2H-pyran-2-methyl)phthalate as a vinyl ether ingredient.

10. A foamed cellular polymeric material as claimed in claim 1 wherein the acidic catalyst of the foamable composition is at least one member selected from the group consisting of boron trifluoride and boron trifluoride etherate.

11. A foamed cellular polymeric material as claimed in claim 1 wherein the foaming agent of the foamable composition is a chlorofluorocarbon.

12. A process which comprises mixing, essentially
 (A) at least one polymerizable cyclic vinyl ether of the general formula

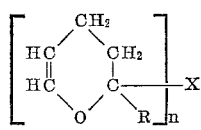

wherein $n$ is an integer having a value of at least two, R is a member selected from the group consisting of the hydrogen atom and the carboxaldehyde radical and X is a linking group having a valence equal to $n$;
 (B) an acidic catalyst capable of promoting the polymerization of said vinyl ether and selected from the group consisting of strong proton-donating acids and Lewis acids; and
 (C) a foaming agent vaporizing at the temperature of polymerization of said vinyl ether;
and allowing the mixture naturally to self-expand into a foamed cellular polymeric material.

13. A process as claimed in claim 12 wherein there is incorporated into the expandable mixture a material reactive with the ethylenic double bonds of the vinyl ether.

14. A process as claimed in claim 13 wherein the material reactive with the ethylenic double bonds of the vinyl ether is a member selected from the group consisting of
 (D) compatible aliphatic and aromatic polyamides;
 (E) compatible polycarbamates obtained by the condensation of polyisocyanates with aliphatic polyols;
 (F) alpha, beta-monoethylenically unsaturated monomers copolymerizable with said vinyl ether;
 (G) mixtures of (F) with compatible phenolic compounds;
 (H) mixtures of (F) with compatible aliphatic monohydric or polyhydric alcoholic compounds; and
 (I) mixtures of (F) with compatible epoxidized materials containing at least one epoxide group per molecule.

15. A process as claimed in claim 14 wherein the portions of the ingredients of the expandable mixture are such that
 (D) the number of amido groups provided by the polyamide is less than 10% of the number of

—CH=CH— groups provided by the vinyl ether;
 (E) the number of carbamate groups provided by the polycarbamate is less than 75% of the number of —CH=CH— groups provided by the vinyl ether;
 (F) the number of ethylenic groups provided by the monoethylenically unsaturated compound is not more than three times the number of —CH=CH— groups provided by the vinyl ether;
 (G) the combined number of ethylenic and hydroxyl groups provided by the monoethylenically unsaturated and phenolic compounds, respectively, ranges from less than 75% of the number of —CH=CH— groups provided by the vinyl ether when the amount of phenolic compound exceeds that of monoethylenically unsaturated compound, to not more than three times the number of —CH=CH— groups provided by the vinyl ether when the amount of monoethylenically unsaturated compound exceeds that of phenolic compound;
 (H) the combined number of ethylenic and hydroxyl groups provided by the monoethylenically unsaturated and alcoholic compounds, respectively, ranges from less than 75% of the number of —CH=CH— groups provided by the vinyl ether when the amount of alcoholic compound exceeds that of monoethylenically unsaturated compound, to not more than three times the number of —CH=CH— groups provided by the vinyl ether when the amount of monoethylenically unsaturated compound exceeds that of alcoholic compound; and
 (I) the number of ethylenic groups provided by the monoethylenically unsaturated compound is not more than three times the combined number of

—CH=CH— and epoxide groups provided by the vinyl ether and epoxidized material, respectively.

References Cited by the Examiner
UNITED STATES PATENTS

| | | | |
|---|---|---|---|
| 2,998,415 | 8/1961 | Geiser | 260—91.1 |
| 3,051,665 | 8/1962 | Wismer | 260—2.5 |
| 3,128,258 | 4/1964 | Doedens et al. | 260—2.5 |
| 3,232,892 | 2/1966 | Fisher | 260—2.5 |

MURRAY TILLMAN, *Primary Examiner.*
MORTON FOELAK, *Assistant Examiner.*

UNITED STATES PATENT OFFICE
CERTIFICATE OF CORRECTION

Patent No. 3,311,574                                March 28, 1967

William David Samuel Bowering et al.

It is hereby certified that error appears in the above numbered patent requiring correction and that the said Letters Patent should read as corrected below.

Column 29, lines 41 to 45, the formula should appear as shown below instead of as in the patent:

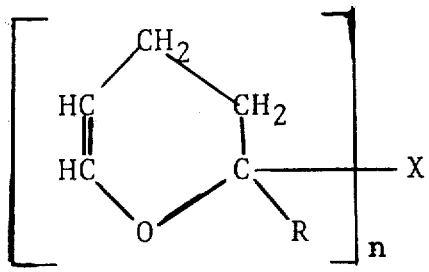

Signed and sealed this 14th day of November 1967.

(SEAL)
Attest:

EDWARD M. FLETCHER, JR.                      EDWARD J. BRENNER
Attesting Officer                              Commissioner of Patents